(12) United States Patent
Tulej (10) Patent No.: US 10,563,539 B2
(45) Date of Patent: Feb. 18, 2020

(54) TURBINE ENGINE WITH BEARING ASSEMBLY

(71) Applicant: General Electric Company Polska sp. zo.o, Warsaw (PL)

(72) Inventor: Piotr Tulej, Warsaw (PL)

(73) Assignee: General Electric Company Polska sp. zo.o, Warsaw (PL)

(*) Notice: Subject to any disclaimer, the term of this patent is extended or adjusted under 35 U.S.C. 154(b) by 0 days.

(21) Appl. No.: 16/020,017

(22) Filed: Jun. 27, 2018

(65) Prior Publication Data
US 2019/0048743 A1 Feb. 14, 2019

(30) Foreign Application Priority Data

Aug. 11, 2017 (EP) ..................................... 17461584
Oct. 12, 2017 (EP) ..................................... 17196079

(51) Int. Cl.
| | |
|---|---|
| *F16C 27/04* | (2006.01) |
| *F01D 25/16* | (2006.01) |
| *F01M 11/00* | (2006.01) |
| *F16F 15/02* | (2006.01) |
| *F16F 15/023* | (2006.01) |

(52) U.S. Cl.
CPC ....... *F01D 25/164* (2013.01); *F01M 11/0004* (2013.01); *F16C 27/045* (2013.01); *F16F 15/022* (2013.01); *F16F 15/0237* (2013.01); *F01M 2011/0008* (2013.01); *F05D 2220/323* (2013.01); *F05D 2240/14* (2013.01); *F05D 2240/50* (2013.01); *F05D 2260/52* (2013.01); *F05D 2260/96* (2013.01); *F05D 2260/98* (2013.01)

(58) Field of Classification Search
CPC .... F16C 27/04; F16C 27/045; F16C 2360/23; F01D 21/045; F01D 25/164; F16F 15/022; F16F 15/0237; F01M 11/0004; F01M 2011/0008
See application file for complete search history.

(56) References Cited

U.S. PATENT DOCUMENTS

| | | |
|---|---|---|
| 5,088,840 A | 2/1992 | Radtke |
| 8,182,156 B2 | 5/2012 | Kinnaird et al. |
| 8,727,632 B2 | 5/2014 | Do et al. |
| 8,747,054 B2 | 6/2014 | Witlicki |
| 9,003,811 B2 | 4/2015 | Barnett et al. |
| 9,410,608 B2 | 8/2016 | McCune et al. |
| 2002/0127102 A1 | 9/2002 | Corattiyil et al. |
| 2010/0027930 A1* | 2/2010 | Kinnaird ............... F01D 25/164 384/523 |

(Continued)

OTHER PUBLICATIONS

Extended European Search Report corresponding to EP Application No. 17196079.2 dated Mar. 27, 2018.

*Primary Examiner* — Phillip A Johnson
(74) *Attorney, Agent, or Firm* — McGarry Bair PC (57) ABSTRACT

An apparatus and method for a bearing assembly including a frame, an inner race circumscribing a shaft for a turbine engine, a bearing movable about the inner ring, an outer race circumscribing the at least one rolling element, a spring assembly comprising an inner ring circumscribing the at least one cage, and an outer ring mounted to the frame, and a set of circumferentially arranged spring fingers extending between the inner ring and the outer ring.

23 Claims, 4 Drawing Sheets

(56) References Cited

U.S. PATENT DOCUMENTS

| | | |
|---|---|---|
| 2012/0213629 A1 | 8/2012 | Rouesne |
| 2013/0108202 A1 | 5/2013 | Do et al. |
| 2013/0280063 A1* | 10/2013 | Ganiger .................. F16C 19/54 |
| | | 415/229 |
| 2017/0145855 A1* | 5/2017 | Ganiger ................ F01D 25/162 |
| 2017/0226894 A1* | 8/2017 | Ganiger ................ F01D 25/162 |
| 2018/0266275 A1* | 9/2018 | Ganiger ................ F01D 25/164 |

* cited by examiner

TURBINE ENGINE WITH BEARING ASSEMBLY

BACKGROUND OF THE INVENTION

A turbine engine includes one or more shafts, together forming a rotor, which are mounted for rotation in several bearings, which can include rolling bearings. Any unbalance on the rotors results in dynamic loads. Reducing dynamic loads can be achieved by introducing a flexible support for one or more of the bearings, instead of mounting the bearings directly in a stationary frame. The flexible support can be integrated with a part of the bearing. The flexible support can have a stiffness reduced to a level which allows to lower dynamic loads to levels acceptable for the engine and airframe. To allow certain displacements of the bearing together with the rotor, a clearance between the flexible support and a frame is provided.

In conditions of high unbalance the dynamic loads are in most cases high enough to close the gap between the flexible support and a frame. In such cases the dynamic characteristic of the engine changes due to formulation of a new, stiffer load path from a bearing directly to a frame.

Accordingly, there is a need for a bearing support system which would give required flexibility during high unbalance conditions, without affecting engine dynamics in normal operating conditions.

BRIEF DESCRIPTION OF THE INVENTION

In one aspect, the present disclosure relates to a turbine engine comprising a frame defining a central aperture, a shaft extending in a fore to aft direction through the central aperture, a bearing assembly rotationally supporting the shaft. The turbine engine also comprises a spring assembly comprising a first and second set of spring fingers having differing stiffness where the second set of spring fingers has an inner ring circumscribing the bearing assembly and an outer ring mounted to the frame, and a set of circumferentially arranged spring fingers extending between the inner ring and the outer ring, and a damper circumscribing the inner ring and separating the inner ring from the frame.

The bearing assembly can include at least one inner race circumscribing the shaft, at least one rolling element movable about the inner race, and at least one outer race circumscribing the at least one rolling element. The inner ring can be a first inner ring and a second inner ring and the second inner ring is the at least one outer race of the bearing assembly. The damper can comprise a damper housing integral with the first inner ring.

The first and second set of spring fingers can comprise a plurality of spring fingers circumferentially and alternatingly arranged with respect to each other. The first set of spring fingers can have a greater stiffness than the second set of spring fingers.

A gap can be formed between the damper and the bearing assembly during normal operating conditions. The gap can close in an ultimate event.

The damper can be flexible and include a squeeze film damper.

The frame can be an annular stationary frame, the damper is an annular damper, and the bearing assembly is an annular bearing assembly spaced from the annular damper to define a gap.

In another aspect, the present disclosure relates to a sump assembly comprising a frame, at least one inner race, at least one rolling element movable about the at least one inner race, at least one outer race circumscribing the at least one rolling element, a spring assembly comprising an inner ring circumscribing the at least one inner race, and an outer ring mounted to the frame, and a first and second set of circumferentially arranged spring fingers having differing stiffness extending between the inner ring and the outer ring, and a damper circumscribing the inner ring and separating the inner ring from the frame.

The inner ring can be a first inner ring and a second inner ring and the second inner ring is the outer race of the bearing assembly. The damper can comprise a damper housing integral with the first inner ring.

The first and second set of spring fingers can comprise a plurality of spring fingers circumferentially and alternatingly arranged with respect to each other. The first set of spring fingers can have a greater stiffness than the second set of spring fingers.

A gap can be formed between the damper and the bearing assembly during normal operating conditions. The gap can close in an ultimate event.

The damper can be a squeeze film damper.

The frame can be an annular stationary frame and the bearing assembly is an annular bearing assembly within the annular stationary frame.

In yet another aspect the present disclosure relates to, a method for carrying a varying load through a damper assembly, the method comprising, introducing flexibility to a load path, alternating a load between a damper flexible support and a bearing flexible support, and directing at least a portion of the load through a damper when a gap within the damper assembly becomes closed.

The directing a load can include directing the load through the damper flexible support having a higher stiffness than the bearing flexible support. The directing a load can include reducing a dynamic load during an ultimate event.

DETAILED DESCRIPTION OF THE INVENTION

Aspects of the disclosure described herein are directed to a damper assembly for a turbine engine including a first and second set of spring fingers in which at least a portion of at least one of the sets of spring fingers is circumscribed by an annular damper. For purposes of illustration, the present disclosure will be described with respect to a turbine for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
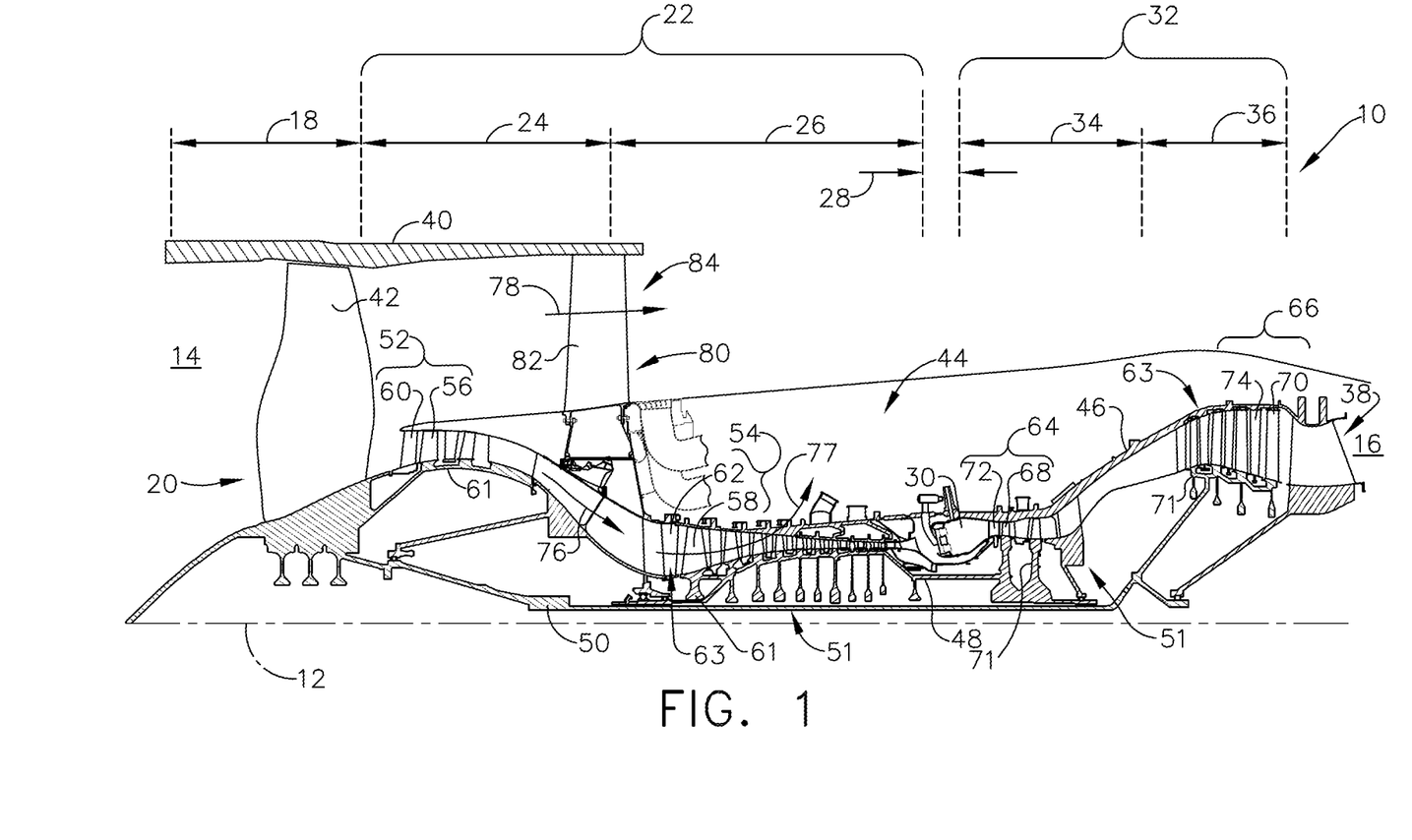
FIG. 1 is a schematic cross-sectional diagram of a turbine engine for an aircraft.

Referring to FIG. 1, an engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34, and an LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

An HP drive shaft or spool 48 disposed coaxially about the centerline 12 of the engine 10 drivingly connects the HP turbine 34 to the HP compressor 26. An LP drive shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the corresponding compressor mount to a disk 61, which mounts to the corresponding one of the LP and HP spools 50, 48, with each stage having its own disk 61. The vanes 60, 62 for a stage of the corresponding compressor mount to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the corresponding turbine can mount to a disk 71, which mounts to the corresponding one of the HP and LP spools 48, 50, with each stage having a dedicated disk 71. The vanes 72, 74 for a stage of the corresponding turbine can mount to the core casing 46 in a circumferential arrangement.

Complementary to the rotor portion, the stationary portions of the engine 10, such as the static vanes 60, 62, 72, 74 among the compressor and turbine sections 22, 32 are also referred to individually or collectively as a stator 63. As such, the stator 63 can refer to the combination of non-rotating elements throughout the engine 10.

In operation, the airflow exiting the fan section 18 splits such that a portion of the airflow is channeled into the LP compressor 24, which then supplies pressurized air 76 to the HP compressor 26, which further pressurizes the air. The pressurized air 76 from the HP compressor 26 mixes with fuel in the combustor 30 where the fuel combusts, thereby generating combustion gases. The HP turbine 34 extracts some work from these gases, which drives the HP compressor 26. The HP turbine 34 discharges the combustion gases into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
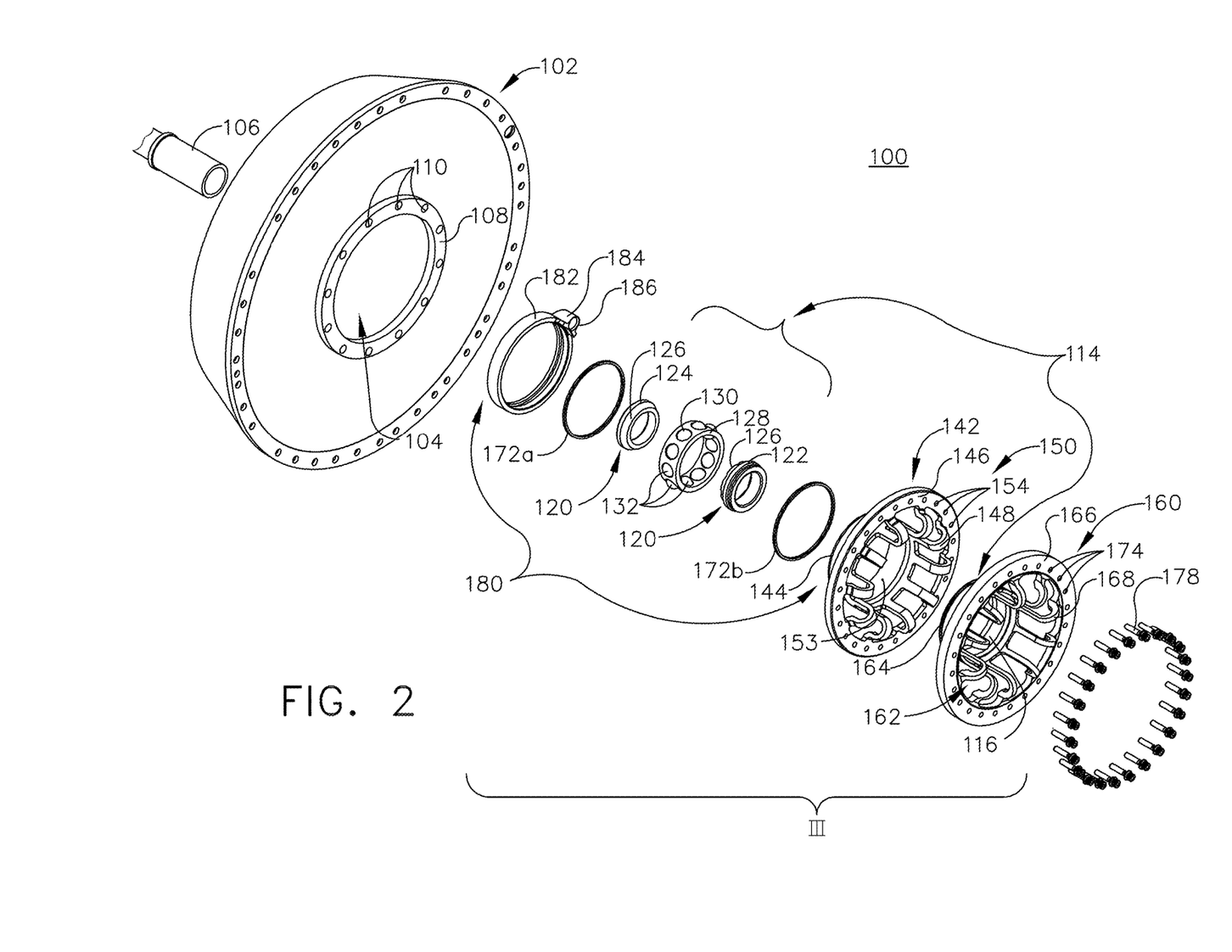
FIG. 2 is an exploded perspective diagram of a damper assembly for the turbine engine of FIG. 1.

FIG. 2 is an exploded view of a sump assembly 100 including a frame 102 with a central aperture 104 through which a shaft 106, by way of non-limiting example the HP drive shaft 48, can extend in a fore to aft direction. The frame 102 includes a rim 108 circumscribing the central aperture 104. The rim 108 can include a set of rim bolt holes 110.

A bearing assembly 114 can include an inner race 120 with an aft inner race ring 122 and a forward inner race ring 124 together forming a raceway 126. A cage 128 circumscribes the inner race 120 and includes at least one aperture 130. The cage 128 can hold at one least rolling element 132 movable about the inner race 120. While illustrated as a ball bearing assembly, any type of bearing assembly is contemplated, including but not limited to roller bearing supports for turbine engines.

A first spring assembly, or a damper flexible support 150 can have a pair of rings 142 including a first inner ring 144, a first outer ring 146. A first set of circumferentially arranged spring fingers 148 can extend between the first and second inner rings 144, 146. The first outer ring 146 can include a first set of ring bolt holes 154.

A second spring assembly, or a bearing flexible support 160 can have a pair of rings 162 including a second inner ring 164 and a second outer ring 166. The bearing flexible support 160 has a second set of spring fingers 168 circumferentially arranged and extending between the second inner ring 164 and the second outer ring 166. The first set of spring fingers 148 has a spring stiffness that is greater than the second set of spring fingers 168. The second outer ring 166 can include a second set of ring bolt holes 174. It is contemplated that the second inner ring 164 can circumscribe the cage 128 to form at least a portion of an outer race 116 of the bearing assembly 114.

While illustrated as axially spaced aft of the first and second inner rings 144, 164, it is contemplated that the first and second outer rings 146, 166 can be axially spaced forward of the first and second inner rings 144, 164. It is further contemplated that the first and second inner rings 144, 164 can be formed as one singular inner ring and the first and second outer rings 146, 166 can be formed as one singular outer ring. The formation and orientation of the inner and outer rings should not be limiting and is for illustrative purposes only.

A plurality of bolts 178 are circumferentially arranged and have a length L long enough to extend through the first and second sets of ring bolt holes 154, 174 and the set of rim bolt holes 110.

A damper housing 180 can be integral with the damper flexible support 150 such that the first inner ring 144 is a damper support 153 of the damper housing 180 when assembled. The damper housing 180 can include an annular damper 182.

Figure 3:
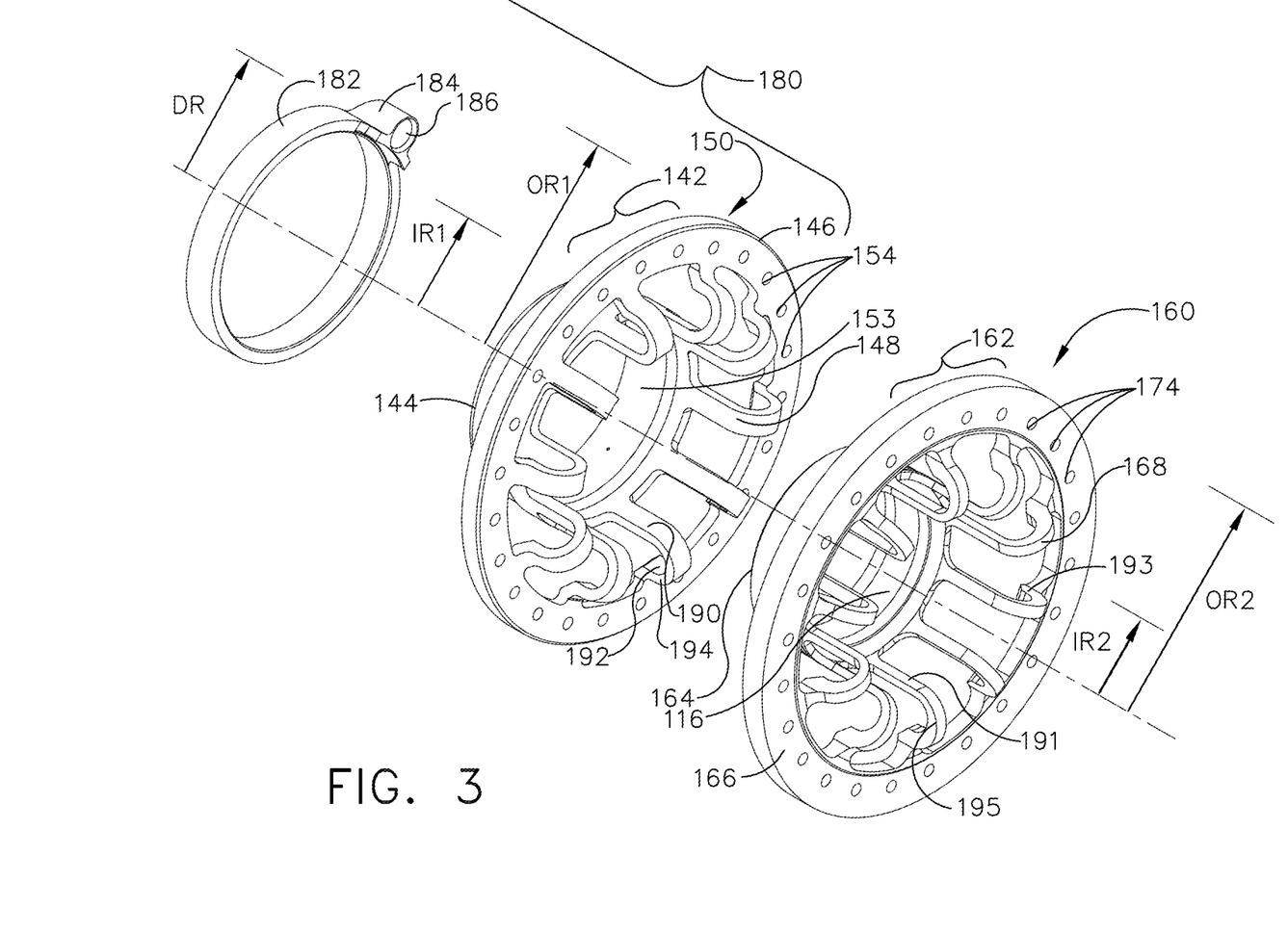
FIG. 3 is an enlarged view of a bearing assembly for the damper assembly of FIG. 2.

Turning to FIG. 3, an enlarged view of area III from FIG. 2 is illustrated to more clearly show the damper housing 180 with respect to the damper flexible support 150 and the bearing flexible support 160. Portions of the bearing assembly 114 have been removed for clarity. The first inner ring 144 defines an inner radius IR1 and the first outer ring 146 defines an outer radius OR1 greater than the inner radius IR1. The second inner ring 164 defines an inner radius IR2 smaller than the first inner radius IR1 and an outer radius OR2 equal to the outer radius OR1. The damper housing 180 defines a third radius DR larger than both the first and second inner radii IR1, IR2.

The sets of circumferentially arranged spring fingers 148, 168 can be multiple spring fingers 148, 168 circumferentially arranged and extending between the inner rings 144, 164 and the outer rings 146, 166. The first set of spring fingers 148 can include a first interior arm 190 extending from the first inner ring 144 in a fore to aft axial direction. A first exterior arm 192 can extend in a fore to aft axial direction from the first outer ring 146. A first bend 194 can connect the first interior arm 190 to the first exterior arm 192. The first bend 194 defines a radially outward turn from the first interior arm 190 to the first exterior arm 192 of each of the first spring fingers 148. It is contemplated that the first interior arm 190 is axially longer than the first exterior arm 192.

Similarly the second set of spring fingers 168 can include a second interior arm 191 extending from the second inner ring 164 in a fore to aft axial direction radially turning at a second bend 195 and terminating in a second exterior arm 193 attaching at the second outer ring 166. It is contemplated that the second interior arm 191 is axially longer than the second exterior arm 193. It is further contemplated because the second set of spring fingers 168 has a lesser stiffness than the first set of spring fingers 148, that the second interior arm 191 is longer and thinner than the first interior arm 190 and that the second exterior arm 193 is shorter and thinner than the first exterior arm 192.

A pair of piston rings 172a, 172b can circumscribe the second inner ring 164 when the sump assembly 100 is fully assembled. The sump assembly 100 including the frame 102 and the bearing assembly 114 are all annular.

Figure 4:
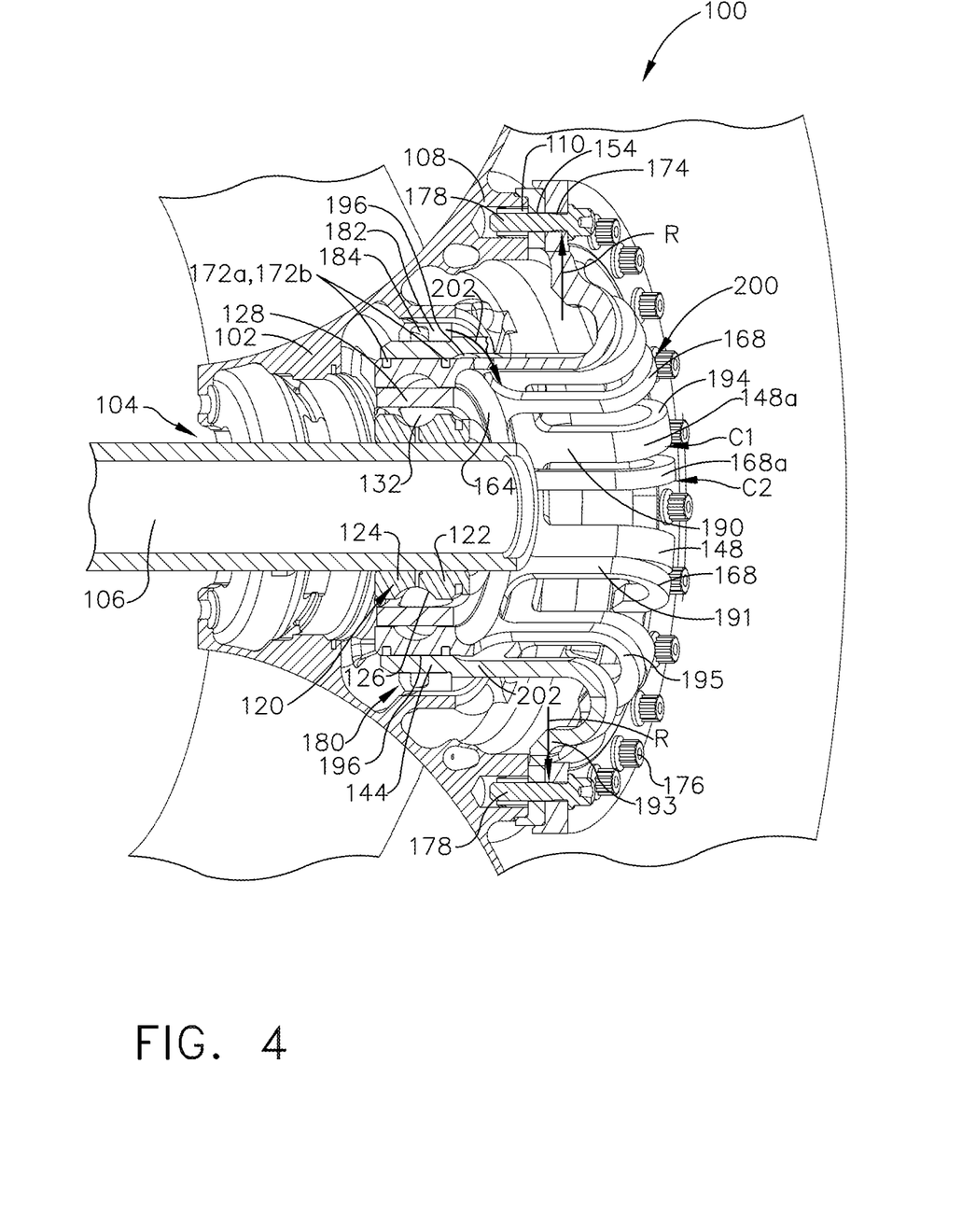
FIG. 4 is a cross-sectional view of the damper assembly of FIG. 2 assembled.

A cross section of the assembled sump assembly 100 is illustrated in FIG. 4. The first and second set of spring fingers 148, 168 are each circumferentially alternatingly arranged with respect to each other. An alternating pattern 200 includes a first spring finger 148a provided at a first circumferential position C1 and a second spring finger 168a provided at a second circumferential position C2 next to the first circumferential position C1. This alternating pattern 200 continues such that the first and second set of spring fingers 148, 168 are circumferentially staggered to form the alternating pattern.

As part of the bearing flexible support 160, the second set of spring fingers 168 provides support for the bearing assembly 114 during normal operating conditions. Normal operating conditions are any conditions under which the engine is designed to operate. Any radial oscillation of the shaft and/or frame translates to flexion of the second set of spring fingers 168 such that the second set of spring fingers 168 provides radial support to the bearing assembly 114 and reduces dynamic loads from rotor 51 unbalance.

The first inner ring 144 is spaced from the second inner ring 164 to define a radial gap 196 therebetween. Clearance between the first inner ring 144 and the second inner ring 164 is enough to prevent bottoming, or closing of the gap 196, during normal operating conditions. Under normal operating conditions the gap 196 remains open and the annular damper 182 can provide an annular path 202 along which dynamic loads can travel to maintain stability within the frame 102. Effectively, the annular damper 182 minimizes normal radial oscillating movements of the shaft 106 during normal operation.

The first set of spring fingers 148 of the damper flexible support 150 has a greater stiffness than the second set of spring fingers 168 of the bearing flexible support 160 and provides additional dynamic support during an ultimate event. An ultimate event can include, by way of non-limiting example, a blade-out. A blade-out can be when a blade, such as the turbine blade 68, within the engine 10 either breaks, hits a shroud, or is otherwise damaged. During the ultimate event the gap 196 closes and the first set of spring fingers 148 becomes engaged between the frame 102 and shaft 106 and provides a stiffer support to the frame 102 compared to the second set of spring fingers 168.

A method for carrying a varying load within the bearing assembly 114 discussed herein can include alternating a load, by way of non-limiting example, a radial load R, from the second set of spring fingers 168 to the first set of spring fingers 148. The method further includes directing at least a portion of the load through the annular damper 182 when the gap 196 closes. The method as discussed herein enables a reduction of dynamic loads resulting from an ultimate event by introducing additional flexibility to a load path, for example the radial load R, as discussed herein, extending from the bearing assembly 114 to the annular stationary frame.

Aspects of the disclosure as discussed herein provide a bearing support apparatus in which the first set of spring fingers provide a damper flexible support between the second set of spring fingers acting as a bearing flexible support and the frame, to reduce dynamic loads during ultimate or high unbalance events. The first set of spring fingers can be at least in part integral with the damper housing for the squeeze film damper in the event this type of function is required for normal operating conditions.

Benefits associated with aspects of the disclosure discussed herein relate to an ultimate event when the gap can close resulting in an abrupt increase in the stiffness of any load path between the bearing assembly and the frame which can translate to higher dynamic loads within the engine. Effectively the damper assembly as described herein provides a progressive stiffness during ultimate events such that in an ultimate event, the reduction of dynamic loads is a direct effect of reduced stiffness along the load path.

An additional spring assembly decreases a need for parts sized for ultimate loads which can translate to a reduction of weight and cost savings.

It should be appreciated that application of the disclosed design is not limited to turbine engines with fan and booster sections, but is applicable to turbojets and turboprop/turboshaft engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine comprising:
a frame defining a central aperture;
a shaft extending in a fore to aft direction through the central aperture;
a bearing assembly rotationally supporting the shaft;
a spring assembly comprising an inner ring circumscribing and defining at least a portion of the bearing assembly and an outer ring mounted to the frame, a first and a second set of circumferentially arranged spring fingers having differing stiffnesses, and extending between the inner ring and the outer ring; and
a damper circumscribing the inner ring and separating the inner ring from the frame.

2. The turbine engine of claim 1 wherein the bearing assembly includes at least one inner race circumscribing the shaft, at least one rolling element movable about the inner race, and at least one outer race circumscribing the at least one rolling element.

3. The turbine engine of claim 2 wherein the inner ring is a first inner ring and a second inner ring and the second inner ring is the at least one outer race of the bearing assembly.

4. The turbine engine of claim 3 wherein the damper comprises a damper housing integral with the first inner ring.

5. The turbine engine of claim 1 wherein the first and second set of spring fingers comprise a plurality of spring fingers circumferentially and alternatingly arranged with respect to each other.

6. The turbine engine of claim 5 wherein the first set of spring fingers has a greater stiffness than the second set of spring fingers.

7. The turbine engine of claim 1 wherein a gap is formed between the damper and the bearing assembly during normal operating conditions.

8. The turbine engine of claim 7 wherein the gap closes in an ultimate event.

9. The turbine engine of claim 1 wherein the damper is flexible.

10. The turbine engine of claim 1 wherein the damper includes a squeeze film damper.

11. The turbine engine of claim 1 wherein the frame is an annular stationary frame, the damper is an annular damper, and the bearing assembly is an annular bearing assembly spaced from the annular damper to define a gap.

12. The turbine engine of claim 1, wherein at least one the first or second set of circumferentially arranged spring fingers comprises an interior arm and an exterior arm radially spaced from the interior arm and a bend defining a radially outward turn from the interior arm to the exterior arm.

13. A sump assembly comprising:
a frame;
a bearing assembly comprising:
at least one inner race;
at least one rolling element movable about the at least one inner race;
at least one outer race circumscribing the at least one rolling element;
a spring assembly comprising an inner ring circumscribing the at least one inner race, and an outer ring mounted to the frame, and a first and second set of circumferentially arranged spring fingers having differing stiffness extending between the inner ring and the outer ring; and a damper circumscribing the inner ring and separating the inner ring from the frame;

wherein the inner ring is a first inner ring and a second inner ring and the second inner ring is the at least one outer race of the bearing assembly.

14. The sump assembly of claim 13 wherein the damper comprises a damper housing integral with the first inner ring.

15. The sump assembly of claim 13 wherein the first and second set of spring fingers comprise a plurality of spring fingers circumferentially and alternatingly arranged with respect to each other.

16. The sump assembly of claim 15 wherein the first set of spring fingers has a greater stiffness than the second set of spring fingers.

17. The sump assembly of claim 13 wherein a gap is formed between the damper and the bearing assembly during normal operating conditions.

18. The sump assembly of claim 17 wherein the gap closes in an ultimate event.

19. The sump assembly of claim 13 wherein the damper is a squeeze film damper.

20. The sump assembly of claim 13 wherein the frame is an annular stationary frame and the bearing assembly is an annular bearing assembly within the annular stationary frame.

21. A method for carrying a varying load through a damper assembly, the method comprising:

introducing flexibility to a load path;

alternating a load between a damper flexible support and a bearing flexible support; and directing at least a portion of the load through a damper when a gap within a damper assembly becomes closed.

22. The method of claim 21 wherein directing the load includes directing the load through the damper flexible support having a higher stiffness than the bearing flexible support.

23. The method of claim 22 wherein directing the load includes reducing a dynamic load during an ultimate event.

* * * * *